US008894904B2

(12) United States Patent
Schateikis et al.

(10) Patent No.: US 8,894,904 B2
(45) Date of Patent: Nov. 25, 2014

(54) STAR DISTRIBUTOR

(75) Inventors: Dieter Schateikis, Stolberg (DE); Elisabeth Arkenau-Maric, Köln (DE); Johannes Bartholomäus, Aachen (DE)

(73) Assignee: Gruenenthal GmbH, Aachen (DE)

( * ) Notice: Subject to any disclaimer, the term of this patent is extended or adjusted under 35 U.S.C. 154(b) by 410 days.

(21) Appl. No.: 12/702,752

(22) Filed: Feb. 9, 2010

(65) Prior Publication Data

US 2010/0181705 A1 Jul. 22, 2010

Related U.S. Application Data

(63) Continuation of application No. PCT/EP2008/006630, filed on Aug. 12, 2008.

(30) Foreign Application Priority Data

Aug. 17, 2007 (DE) ......................... 10 2007 039 043

(51) Int. Cl.
*B29C 43/34* (2006.01)
*B30B 11/34* (2006.01)
*B30B 11/08* (2006.01)
*B30B 15/30* (2006.01)

(52) U.S. Cl.
CPC ................. *B30B 11/34* (2013.01); *B30B 11/08* (2013.01); *B30B 15/30* (2013.01)
USPC ...................... 264/297.5; 264/320; 425/126.1

(58) Field of Classification Search
CPC .. B29C 2043/3466; B30B 11/08; B30B 15/30
USPC ..................... 264/297.5, 310, 320; 425/126.1
See application file for complete search history.

(56) References Cited

U.S. PATENT DOCUMENTS

| | | | | | |
|---|---|---|---|---|---|
| 1,344,091 | A | * | 6/1920 | Schoenkerman | 425/195 |
| 2,879,724 | A | | 3/1959 | Wyatt, Jr. et al | |
| 2,963,993 | A | | 12/1960 | Stott | |
| 3,371,136 | A | * | 2/1968 | Johannsen | 264/109 |
| 4,292,017 | A | * | 9/1981 | Doepel | 425/107 |
| 5,088,915 | A | | 2/1992 | Korsch | |
| 2005/0031546 | A1 | | 2/2005 | Bartholomaus et al. | |
| 2005/0236741 | A1 | | 10/2005 | Arkenau et al. | |
| 2006/0002859 | A1 | | 1/2006 | Arkenau et al. | |
| 2006/0002860 | A1 | | 1/2006 | Bartholomaus et al. | |

FOREIGN PATENT DOCUMENTS

| | | | |
|---|---|---|---|
| DE | 868690 | C | 2/1953 |
| DE | 918374 | C | 10/1954 |
| DE | 1095462 | B | 12/1960 |
| DE | 103 36 400.5 | A1 | 8/2003 |

(Continued)

OTHER PUBLICATIONS

International Search Report Oct. 31, 2008.

*Primary Examiner* — James Sanders
(74) *Attorney, Agent, or Firm* — Norris McLaughlin & Marcus, P.A.

(57) ABSTRACT

The present invention relates to a device for distributing tablet blanks to the dies of a tablet press. The present invention moreover relates to a system consisting of the device according to the invention and a tablet press and to a method for forming tablets from tablet blanks.

6 Claims, 6 Drawing Sheets

(56) References Cited

FOREIGN PATENT DOCUMENTS

| | | | |
|---|---|---|---|
| DE | 103 61 596.2 | A1 | 12/2003 |
| DE | 103 61 596 | A1 | 12/2003 |
| DE | 10 2004 020 220.6 | A1 | 4/2004 |
| DE | 10 2004 032 049.7 | A1 | 7/2004 |
| DE | 10 2004 032 051.9 | A1 | 7/2004 |
| DE | 10 2004 032 103.5 | A1 | 7/2004 |
| DE | 10 2005 005 449.8 | A1 | 2/2005 |
| DE | 10 2005 005 446.3 | A1 | 8/2006 |
| DE | 10 2007 011 485.2 | A1 | 3/2007 |
| EP | 0349777 | A | 1/1990 |
| EP | 0 458 764 | A2 | 11/1991 |
| EP | 0 458 764 | A3 | 11/1991 |
| JP | 59144599 | A | 5/1984 |
| JP | 59120399 | A | 7/1984 |
| JP | 59144598 | A | 8/1984 |

* cited by examiner 8
3
3
5
18
13
11
2
10
14
15

STAR DISTRIBUTOR

This is a Continuation of the 35 USC §371 application of PCT/EP2008/006630, claiming priority to DE 10 2007 039 043.4 filed on Aug. 17, 2007.

BACKGROUND OF THE INVENTION

The present invention relates to a device for distributing tablet blanks to the dies of a tablet press. The present invention moreover relates to a system consisting of the device according to the invention and a tablet press and to a method for forming tablets from tablet blanks.

It is known to form tablets at least in part from blanks. This proceeds, for example, in a tablet press. For this purpose, the tablet blanks must be supplied to the tablet press.

The object of the present invention was therefore to provide a device for distributing tablet blanks to the dies of a tablet press.

BRIEF SUMMARY OF THE INVENTION

The object is achieved by a device for distributing tablet blanks to the dies of a tablet press which comprises a rotating disc on the circumference of which are arranged indentations which accommodate the tablet blanks at least in part in form-fitting manner.

It was extremely surprising and unexpected for a person skilled in the art that it is possible using the device according to the invention to singulate tablet blanks and to supply them in targeted manner to the dies of a tablet press. The device according to the invention is of simple construction and easy to operate.

The device according to the invention is part of a tablet manufacturing process in which a tablet blank is pressed into a highly specific shape in a tablet press. The tablet must accordingly be of a composition such that it may be deformed and then retains this shape. This may involve cold deformation or deformation at an elevated temperature. The shape and size of the blank is preferably already adapted to the desired shape and size of the tablet. After shaping in the tablet press, the shaped blank may be further processed, for example provided with a coating.

The tablet to be manufactured may comprise any desired active ingredients and additives. Preferably, however, these are medicaments which are abuse-protected and which are disclosed for example in 103 36 400.5, 103 61 596.2, 10 2004 020 220.6, 10 2004 032 049.7, 10 2004 032 103.5, 10 2004 032 051.9, 10 2005 005 446.3, 10 2005 005 449.8 and 10 2007 011 485.2. These patent applications are hereby introduced as references and are accordingly deemed to be part of the disclosure.

According to the invention, the device comprises a rotating disc which comprises indentations at its circumference. These indentations accommodate the tablet blanks at least in part in form-fitting manner, i.e. the blank lies with its surface at least partially against the indentation. The indentation is preferably configured such that the tablet blank does not project beyond the edge of the disc. The indentation preferably comprises an inlet zone which simplifies acceptance of the blank in the indentation during rotation of the disc.

In order to prevent the tablet blank from being flung back out of the indentation by centrifugal forces, the device according to the invention preferably comprises an outer blank guide in the circumferential zone of the disc. This blank guide particularly preferably extends from the zone in which the tablet blank is transferred to the disc as far as into the zone in which the tablet blank passes from the indentation into the tablet press die.

Above each indentation, the device preferably comprises an ejector. This ejector particularly preferably presses the blank out of the indentation in such a manner that it falls into the die and/or is pressed into the die. The ejector is particularly preferably arranged at a distance from the indentation, for example pretensioned pointing away from the indentation. The device particularly preferably comprises an actuator, for example a ramp or a rotating means, in particular a cylinder, which presses the actuator in the direction of the indentation and consequently presses the tablet blank out of the indentation. The actuator then returns to its initial position in particular under a spring force.

The device preferably comprises an entry zone and an exit zone, the tablet blanks being transferred onto the disc in the entry zone and into the dies in the exit zone. The entry zone and/or the exit zone are preferably arranged at the circumference of the disc. The entry and exit zones are preferably offset relative to one another by 90°, particularly preferably by 180° and very particularly preferably by 270°.

The actuator is preferably arranged in the exit zone, said actuator in each case cooperating with an ejector and thus pressing the respective tablet blank out of the respective indentation in the direction of the respective die.

In order to ensure that each indentation is filled with a tablet blank, the device according to the invention preferably comprises an acceleration means in the entry zone which presses the tablet blank into the indentation. This preferably comprises a rotary means which briefly comes into engagement with the respective tablet blank and, in so doing, transports, presses and/or accelerates the latter in the direction of the indentations. The means preferably comprises a rotary means which is particularly preferably provided with a rubber-like substance on its circumference, by means of which the kinetic energy of the rotary means is particularly effectively transferred to the tablet blanks.

The entry zone preferably comprises a guide, for example a channel, which guides the tablet blanks in the direction of the disc. The blanks are preferably guided in abutting manner in this guide and preferably at least in the final zone of the guide are under pressure in such a manner that they are pressed into the respective indentation. At least in a sub-zone, this channel comprises a slot, through which the above-described acceleration means engages in the channel and presses the tablet blanks in the direction of the disc with the indentations.

The disclosure made below regarding the system according to the invention and the method according to the invention applies equally to the device according to the invention.

The present invention also provides a system comprising the device according to the invention and a tablet press with dies.

The disclosure made above and the disclosure which is made further below regarding the method according to the invention apply equally to the system according to the invention.

According to the invention, the system comprises the above-described device together with a tablet press. This tablet press may comprise any tablet press familiar to a person skilled in the art in which the active ingredients and additives are pressed to yield a tablet. In general, these tablet presses comprise a plurality of dies which are closed in each case from above and below by a punch. These punches compress the tablet blank preferably under an adjustable pressure such that it takes on the positive shape of the respective die. The lower punch moreover acts as ejector for ejecting the pressed tablet out of the die. The dies are preferably arranged in a rotating body. The two punches associated with a die co-rotate therewith.

According to the invention, the above-described device places the tablet blanks into the respective die. Over the course of one revolution of the die in the tablet press, the tablet blank is pressed into the desired shape and then ejected from the die.

Preferably, the disc of the device according to the invention, which singulates the tablet blanks and places them in the die, and the component in which the dies are arranged rotate synchronously. This synchronisation may be brought about by suitable electronics. Preferably, however, the rotary motion of the disc is derived mechanically from the rotary motion of the tablet press. This forced synchronisation ensures that the respective indentation of the disc and the respective die are aligned on transfer of the tablet blank. The disc is particularly preferably driven by the punches which deform the tablet blank (2). To this end, a component with fingers is preferably arranged under the disc, which fingers engage between the punches of the tablet press and so mesh with the tablet press punches and are driven thereby.

The number of indentations preferably corresponds to the number of dies.

The present invention also provides a method for forming tablets from tablet blanks, comprising the following steps:

a. conveying the blanks towards a rotating disc,
b. accepting the blanks in indentations in the disc in an entry zone,
c. rotating the blanks from the entry zone to the exit zone and
d. transferring the blanks to a tablet press die,
e. forming the blanks in a tablet press.

The explanations provided above regarding the device and the system apply equally to the method according to the invention.

The blanks are preferably pressed into the indentations. This is particularly preferred and ensures that the blank is placed sufficiently far and rapidly enough into the indentation and does not project too far out therefrom, which might result in damage to the tablet blank. As described above, the tablet is pressed in for example using an acceleration wheel.

In the exit zone, the blanks are preferably pressed by an ejector out of the indentations into the tablet press die.

Rotation of the disc and of the dies is preferably synchronised. The rotation of the disc is particularly preferably derived mechanically for this purpose from the rotary motion of the tablet press.

The invention is explained below with reference to FIGS. 1 to 6. These explanations are given merely by way of example and do not restrict the general concept of the invention. The explanations apply equally to all the subject matters of the invention.

BRIEF DESCRIPTION OF THE SEVERAL VIEWS OF THE DRAWING(S)

FIG. 2 shows the device according to the invention.

DETAILED DESCRIPTION OF THE INVENTION

Figure 1:
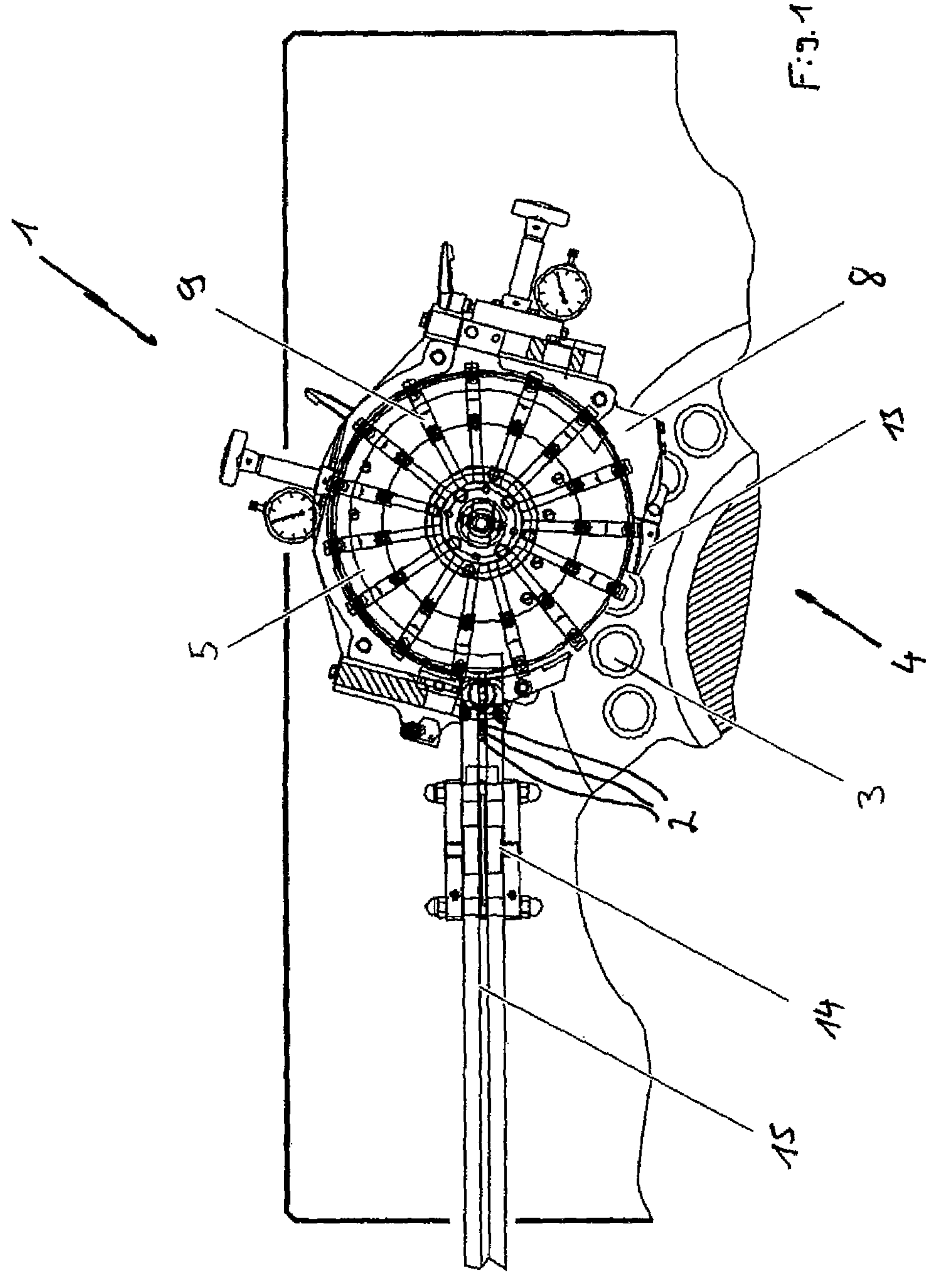
FIG. 1 shows the system according to the invention.
Figure 1:
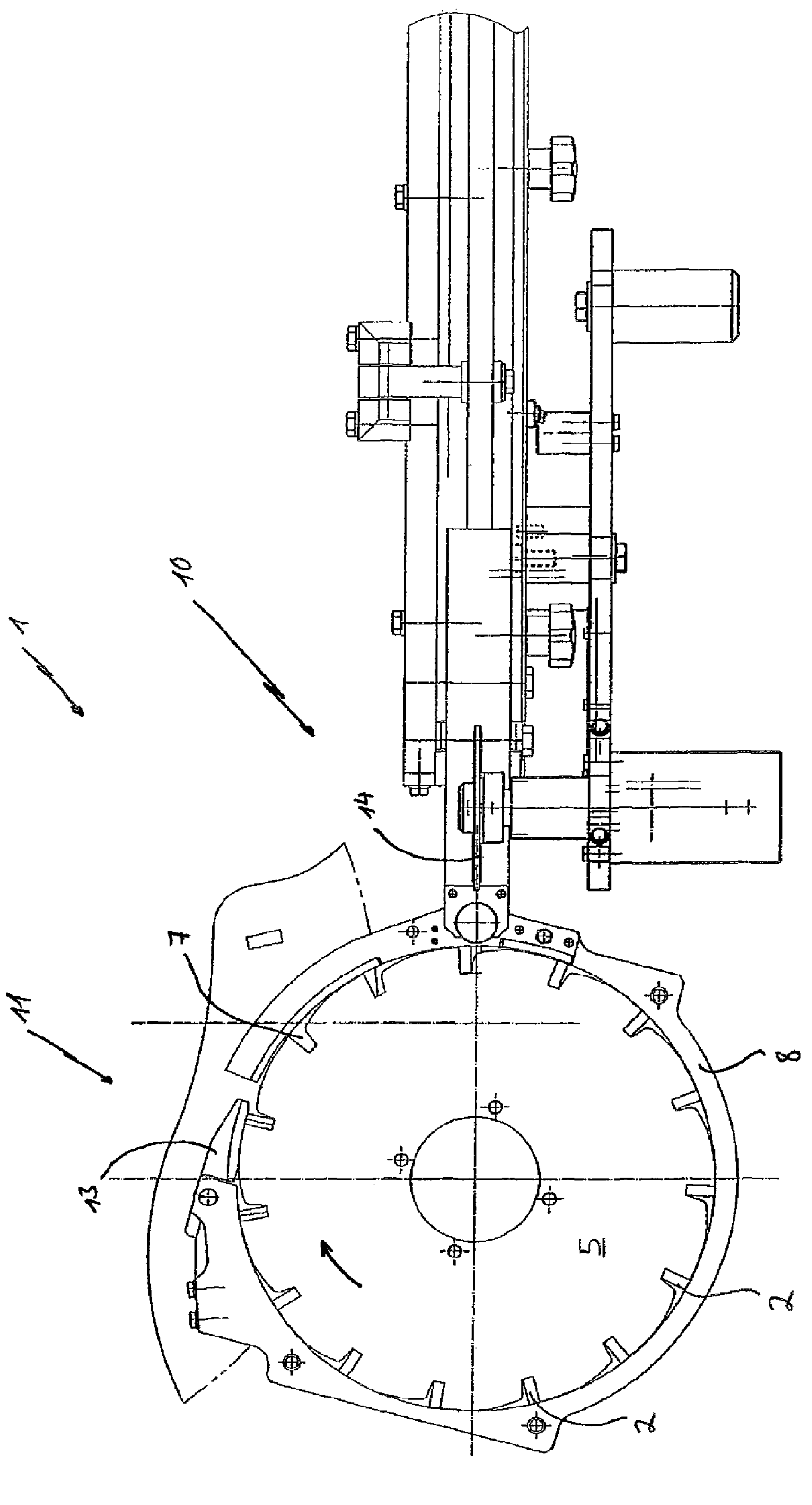

FIG. 1 illustrates the system according to the invention. This comprises the device 1 according to the invention together with a tablet press 4, only part of which is shown. Via a channel 15, tablet blanks 2, which in the present case are substantially cylindrical, are transported in abutting manner in the direction of the disc 5, where they are singulated. In order to achieve a continuous stream of tablet blanks 2 and to ensure that these are conveyed under a certain pressure in the direction of the disc 5, the device 1 according to the invention comprises an acceleration means 14, in the present case a driven disc, which presses blanks in the direction of the disc 5. The disc 5 rotates clockwise and, as may in particular clearly be seen in FIG. 4, comprises indentations 7 on its circumference 6. The tablet blanks 2 are individually accommodated in these indentations 7 and are transported clockwise to the tablet press 4, which comprises a plurality of dies 3 and rotates counterclockwise. The tablet blanks are placed into these dies 3. To this end, the device according to the invention comprises a plurality of ejectors 9, which are located above the indentation and rotate clockwise synchronously therewith. In the zone of the dies 3, these ejectors 9 press the tablet blanks 2 downwards out of the indentations 7, such that they are pressed into the dies 3 and/or fall thereinto under the effect of gravity. In order to prevent the tablet blanks 2 from being flung out of the indentations 7 by centrifugal force, the device according to the invention comprises an outer blank guide 8 which is followed by a pressure segment 13. This pressure segment 13 is mounted rotatably about an axis of rotation 18 perpendicular to the plane of the paper on the outer blank guide 8 and is pretensioned in the direction of the disc 5. This variable pressure segment 13 ensures that, during transfer from the indentation 7 into the die 3, the tablet is pressed into the indentation 3 and is consequently particularly well aligned with the underlying die 3.

FIG. 2 shows the device according to the invention once more in detail. As already described, the tablet blanks (not shown in the present case) are conveyed from right to left along a channel and conveyed or pressed by the disc 14, which projects from above through a slot into the channel, in the direction of the disc 5. The disc 14 is motor driven and comprises a rubber finish on its circumference, which ensures particularly good frictional engagement between the tablet blanks and the disc 14 and prevents damage to the blanks. As shown by the arrow, the disc 5 rotates clockwise. As soon as an indentation 7 rotates past the entry zone 10, a blank is pressed into an indentation due to the pressure produced by the disc 14 and transported onwards by the disc. In order to prevent the blank from being pressed back out of the indentation 7 during transport due to the occurrence of centrifugal forces, the device 1 according to the invention comprises an outer blank guide 8 which terminates in the variable pressure segment 13 already described with reference to FIG. 1. This pressure segment 13 is located in the exit zone 11 of the device according to the invention, in which the tablet blanks 2 are transferred to the respective die 3. The indentation 7 emptied in this manner then rotates onwards into the entry zone 10 and is refilled with a tablet blank 2.

Figure 3:
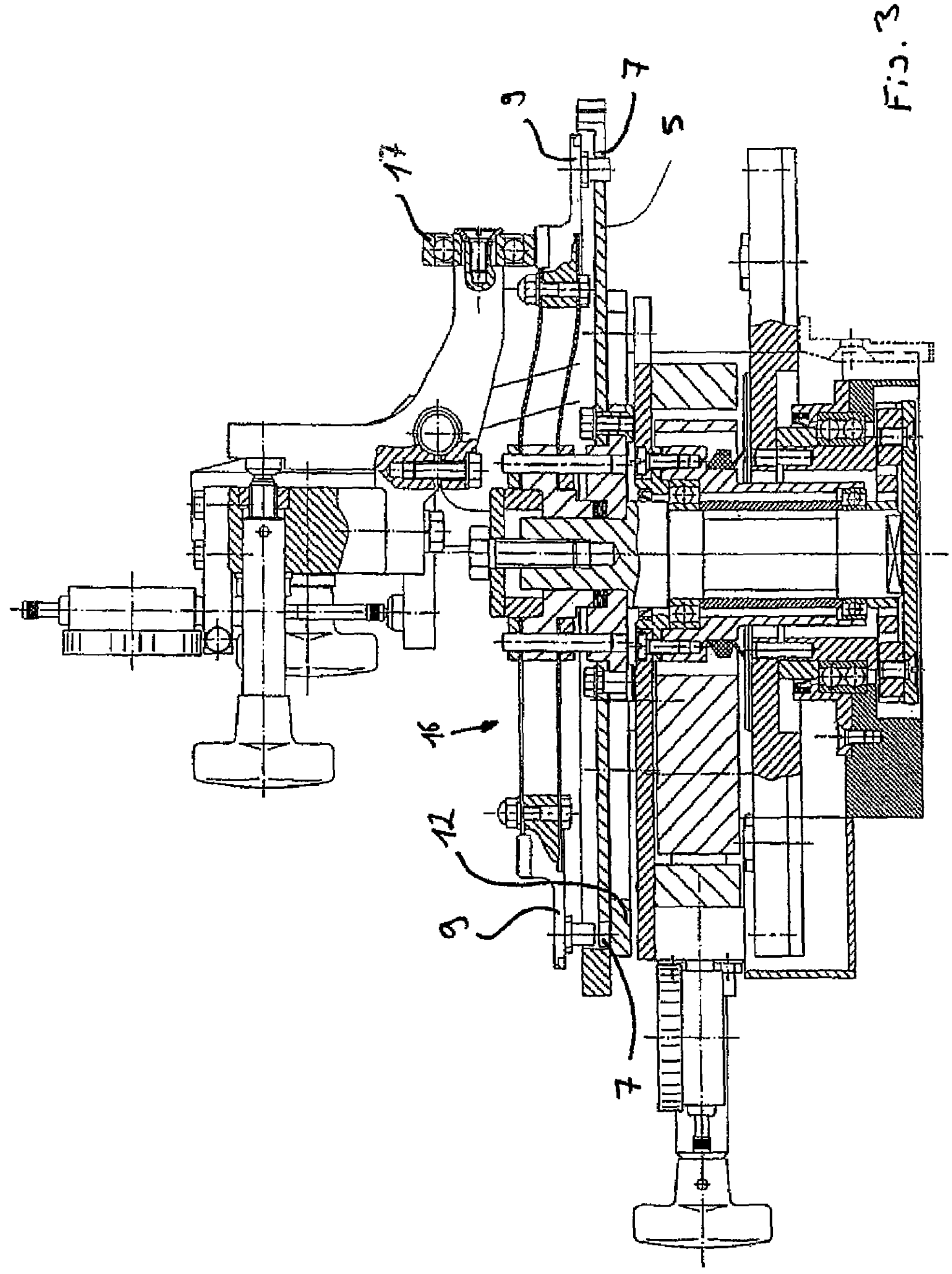
FIG. 3 shows a section through the disc of the device according to FIG. 2.

FIG. 3 shows a section through the device according to FIGS. 1 and 2. The disc 5 with the indentations 7 arranged at the circumference may clearly be seen. Below the disc 5 is arranged a distribution disc 12 which extends from the entry zone 10 to shortly before the exit zone 11 and prevents the tablet blanks from falling downwards out of the disc 5. This distribution disc 12 is not present in the exit zone, so that the tablet blank may as described further below be pressed downwards into the die 3. Above each indentation 7 is arranged an ejector 9, which is suspended from a pivot pin with two flexible metal strips 16. In the exit zone 11 is arranged a stationary actuator, in the present case a ball bearing, which presses the ejector 9 downwards as soon as the latter rotates past the stationary ball bearing 17. As a result, the projection on the ejector is likewise pressed downwards and pushes the tablet blank out of the indentation 7 in the direction of the die 3 and/or into the die 3. As soon as the ejector 9 has rotated past the actuator 17, it springs back into its original position due to the tension in its suspension 16.

Figure 4:
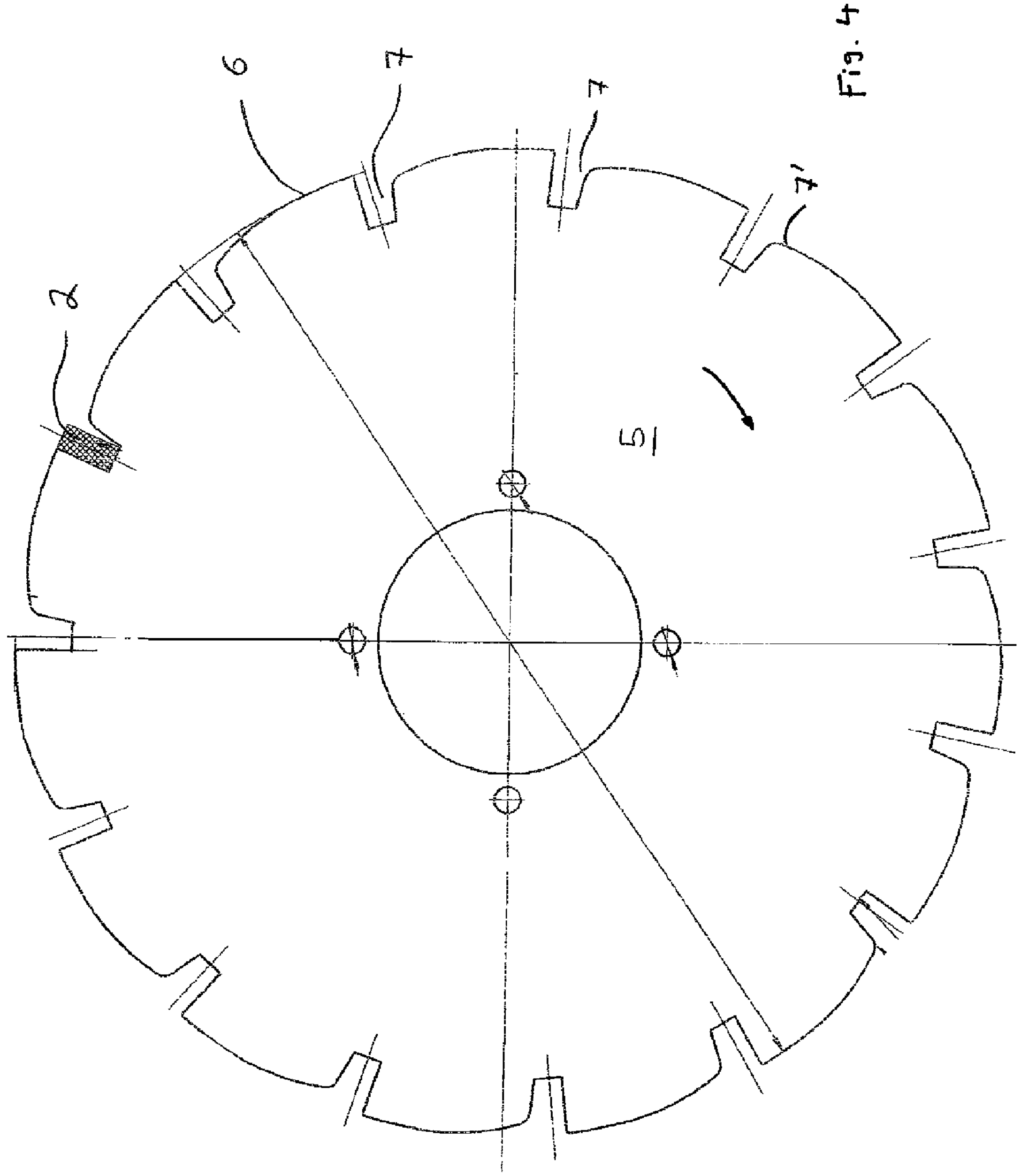
FIG. 4 shows details of the disc.

FIG. 4 shows details of the disc 5, which comprises on its circumference 6 a plurality of indentations 7 into which the tablet blanks may be placed. It may clearly be seen that the indentations 7 are adapted to the shape of the blanks 2, such that the latter fit so closely in the indentation that their position is unambiguously determined. The tablet blank preferably lies against the bottom and at least one side wall of the indentation. The indentation 7 is constructed such that only one tablet blank can fit therein. It may furthermore be seen that the indentations 7 in each case comprise an inlet zone 7' upstream of the indentations relative to the direction of rotation indicated by the arrow. This inlet zone 7' facilitates introduction of the tablet blanks 2 into the indentations 7.

Figure 5:
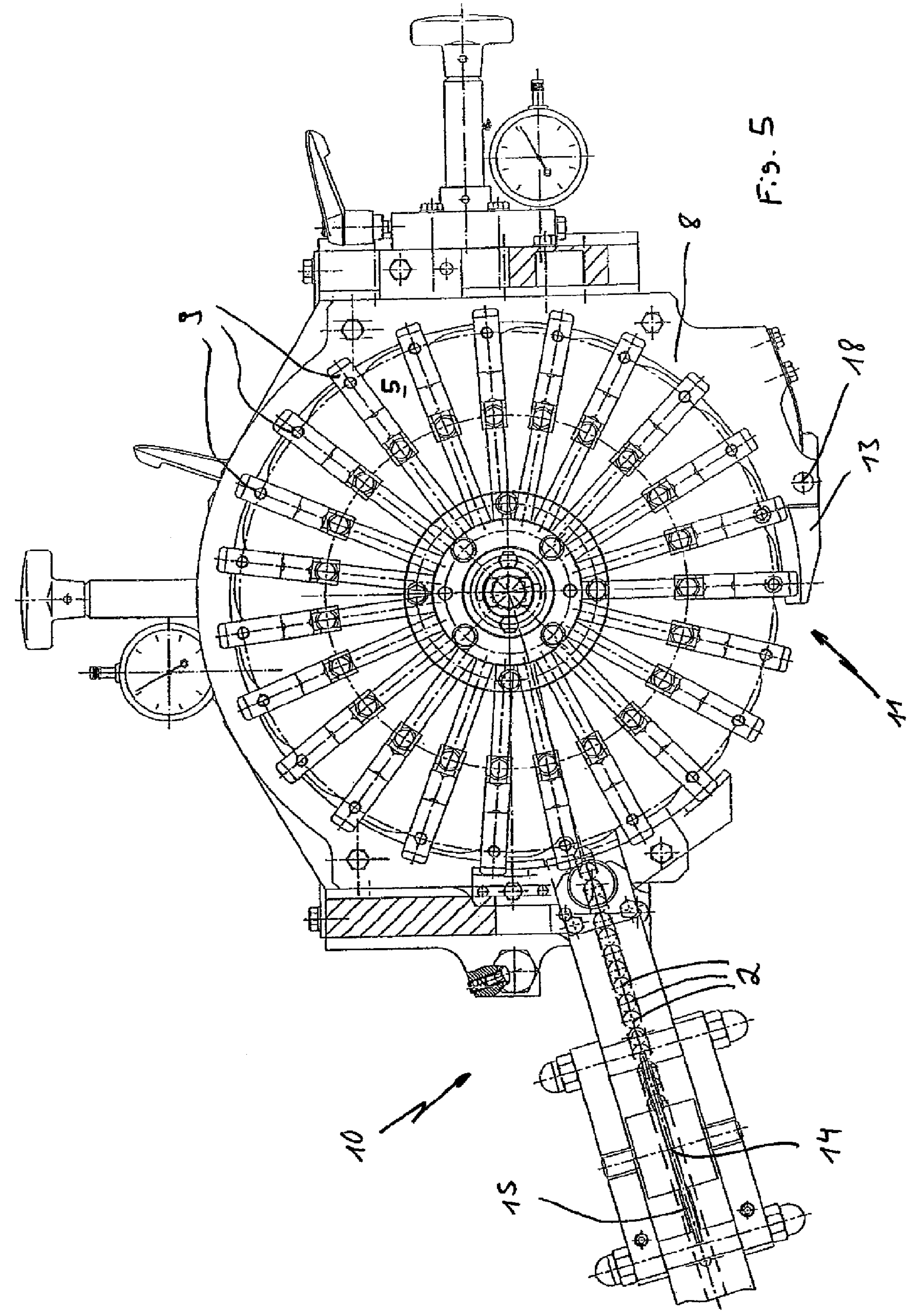
FIG. 5 shows a further view of the device according to the invention.

FIG. 5 again shows a representation of the device according to the invention 1. This representation substantially corresponds to the representation according to FIG. 2, wherein in the present case the ejectors 9 are additionally shown above the indentations 7. It may be seen that an ejector 9 is assigned to each indentation 7. The entry zone 10 is furthermore shown relative to the exit zone 11. It may be seen that, from the entry zone to the exit zone, the tablet blanks 2 substantially rotate by 270°. In the present case, the clockwise rotation of the disc is derived from a counterclockwise rotation of the dies 4 of the tablet press. It is therefore advantageous for the number of indentations 7 at the circumference 6 of the disc 5 to correspond to the number of dies in the tablet press.

Figure 6:
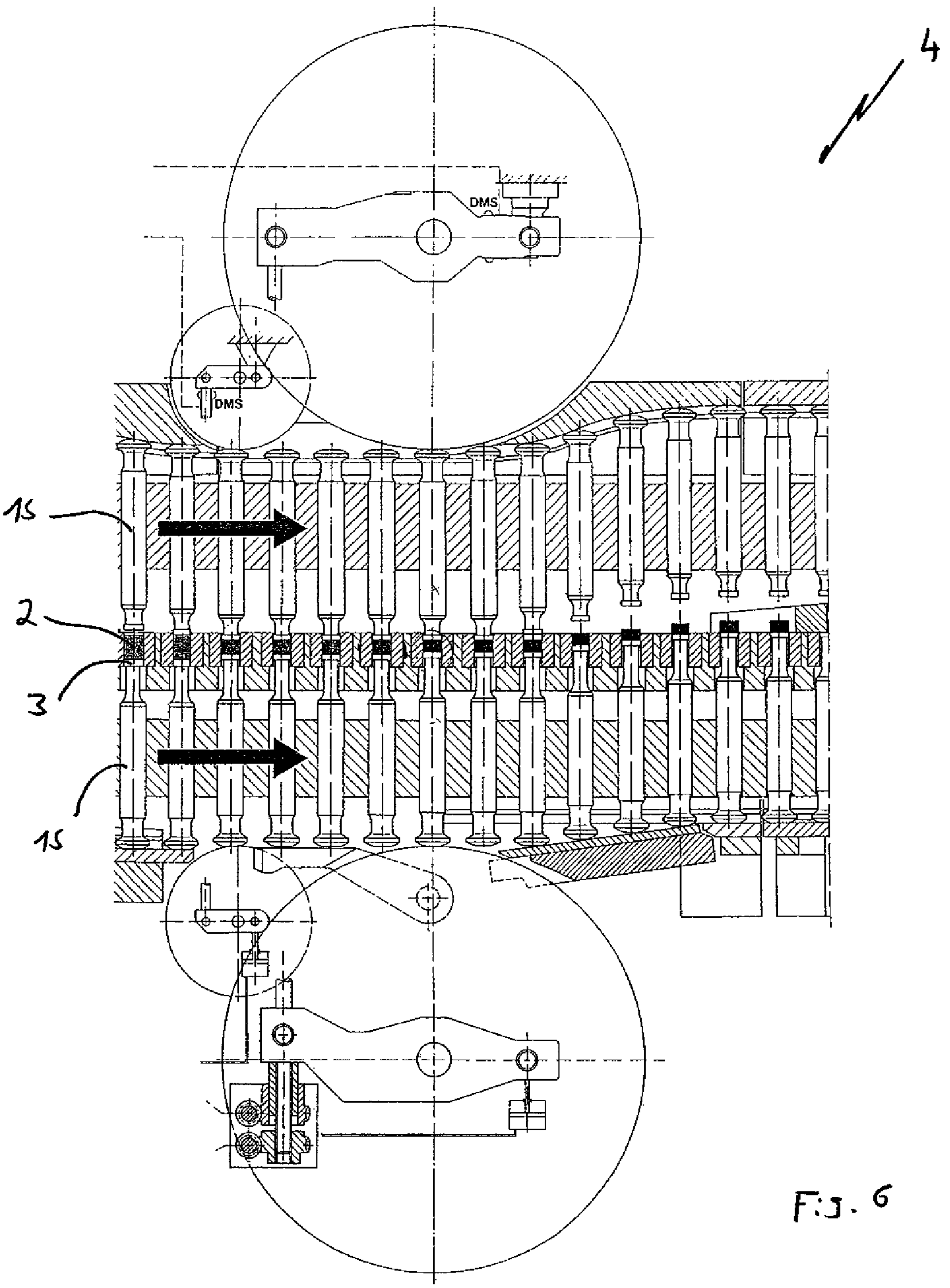
FIG. 6 is a schematic diagram of a tablet press.

FIG. 6 is a schematic diagram of the tablet press 4. The latter comprises a plurality of dies 3, which in the present case rotate counterclockwise and into which a tablet blank 2 is introduced. In each case one punch 15 is arranged vertically displaceably above and below each die 3, the position of which punch may in each case be varied by a cam or by rotating wheels. By a change in position in the direction of the tablet blank, the latter is pressed into the desired shape. As soon as this has taken place, the upper punch is moved back upwards and the lower punch simultaneously ejects the finished tablet out of the die 3 by an upwardly directed movement, after which the tablet is removed from the tablet press 4, such that the entire procedure may begin all over again. The direction of movement of the dies or the punches is shown by the two arrows in FIG. 6. The device according to the invention places the tablet blanks 2 into the dies 3.

LIST OF REFERENCE NUMERALS

1 Device
2 Tablet blank
3 Dies
4 Tablet press
5 Disc
6 Circumference of the wheel
7 Indentation
7' Indentation inlet zone
8 Outer blank guide
9 Ejector
10 Entry zone
11 Exit zone
12 Distribution disc
13 Means for pressing the tablet blanks into the indentation, pressure segment
14 Means for accelerating the blanks in the direction of the indentation
15 Guide, channel
16 Ejector suspension
17 Actuator, ball bearing
18 Pivot pin
19 Punch

The invention claimed is:

1. A method for forming tablets from tablet blanks (2), comprising the following steps:

conveying the blanks (2) horizontally towards a rotating disc (5), providing an accelerator (14) for moving the blanks (2) horizontally towards indentations (7) in the circumference of the rotating disc (5), accepting the blanks (2) in the indentations (7) in the rotating disc (5) in an entry zone (10), rotating the blanks (2) from the entry zone (10) to an exit zone (11) and transferring the blanks (2) to a rotating die (3) of a tablet press (4) in the exit zone (11), forming the blanks in the tablet press (4), wherein above each indentation (7) is arranged an ejector (9) suspended from a pivot pin with two flexible metal strips (16), and in the exit zone (11) is arranged a stationary ball bearing (17) that presses the ejector (9) downwards as soon as the ejector (9) rotates past the stationary ball bearing (17).

2. The method according to claim 1, wherein the blanks (2) are pressed into direct physical contact with the indentations.

3. The method according to claim 1, wherein in the exit zone (11), the blanks (2) are pressed by the ejector (9) downward out of the indentations (7) in the circumference of the rotating disc (5) into the die (3) of the tablet press (4).

4. The method according to claim 1, wherein rotation of the disc (5) and of the dies (3) is synchronized.

5. The method according to claim 1, wherein the rotation of the disc (5) is derived from rotation of the dies (3) of the tablet press (4).

6. The method according to claim 1, wherein the rotation of the disc (5) is opposite that of rotation of the dies (3) of the tablet press (4).

* * * * *